United States Patent [19]

Wu et al.

[11] 4,379,464

[45] Apr. 12, 1983

[54] COOKED FLAVORS FOR SMOKING PRODUCTS

[75] Inventors: D. Louise Wu; James W. Swain, both of Richmond, Va.

[73] Assignee: Philip Morris Incorporated, New York, N.Y.

[21] Appl. No.: 235,456

[22] Filed: Feb. 18, 1981

[51] Int. Cl.³ ............................................. A24B 15/30
[52] U.S. Cl. .................................................... 131/275
[58] Field of Search ................................. 131/275, 276

Primary Examiner—V. Millin
Attorney, Agent, or Firm—Arthur I. Palmer, Jr.; George E. Inskeep

[57] ABSTRACT

Reducing sugars are reacted with ammonium hydroxide or ammonium salts in the presence of a trace amount of certain amino acids to produce reaction flavors for use in smoking compositions and particularly those having a high content of tobacco stems.

12 Claims, No Drawings

COOKED FLAVORS FOR SMOKING PRODUCTS

BACKGROUND OF THE INVENTION

The present invention relates to reaction flavors, and more specifically to cooked flavors suitable for use in smoking compositions. The invention is also concerned with processes for preparing reaction flavors and incorporating them into smoking compositions, particularly those having a high content of tobacco stems, to produce a more acceptable and flavorful smoking product.

In general, tobacco stems and midribs represent an unsatisfactory portion of the cured tobacco leaf, from the standpoint of smoking, in the sense that they produce a stemmy taste on smoking and lack the desirable aroma and taste generally associated with tobacco lamina.

Stems are usually separated from the desirable leaf or lamina of tobacco. To throw away the stems and midribs is uneconomical and, for this reason, methods have been devised to modify and make them usable in smoking products. One of the methods which has been found to be relatively satisfactory, because of its simplicity and low cost, is to pass the stems between rollers in order to break up the bulky, rigid structure and to produce rolled stems, which are a flattened, loosened product which can be shredded and blended with shredded tobacco leaf.

It has been found, however, that the rolled stems still impart a certain amount of the harshness and off-taste which are imparted by tobacco stems to the smoke from cigarettes or other tobacco products into which they are introduced. Stems from burley tobacco are particularly undesirable in this respect. As a consequence, only a small portion of the stems from tobacco used in filler for cigarettes or cigars can be rolled and blended back into the filler.

We have now discovered a means by which rolled stems may be used to produce tobacco products having a more acceptable smoke. Stems from both bright and burley tobacco treated by our process may be used in greater proportion to produce a cigarette which yields comparatively bland smoke.

The present invention comprises contacting tobacco stems, either before, during or after passing the stems between rollers, with a solution of a reaction flavor product produced by reacting reducing sugars with a source of ammonia in the presence of trace amounts of amino acids.

The reaction of sugars with amino acids to produce desirable flavorants for smoking materials has generated increased interest. For example, U.S. Pat. No. 3,478,015 describes "browning reactions" in which an amino acid and a sugar having an active carbonyl are reacted in a lower alkyl polyhydric alcohol solvent in the absence of water at a temperature less than 90° C. for about 5 to 15 hours. Generally the amino acid to solvent ratio is in the range of 1 to 3% by weight and the sugar to solvent ratio is in the range of 3 to 15% by weight. The reaction is carried out in such a manner that no free amino acid remains in the final product. The resultant reaction mixture is applied to tobacco to about 1% by weight of the tobacco.

U.S. Pat. No. 3,920,026 describes tobacco flavorants prepared by reacting valine with a carbonyl compound selected from sugars, dihydroxy acetone, or pyruvaldehyde. The molar ratio of amino acid to carbonyl compound can be from about 1:0.5–10, with a ratio of 1:4–5 being optimum. The reaction takes place in a solvent such as glycerol or propylene glycol and at a temperature between about 120° and 200° C., and preferably at about 150° to 160° C. for 0.5 to 5 hours depending on the type of sugar used. Flavanoid catalysts, such as quercetin or rutin or a hydroxyacid such as ascorbic acid, may be used. The reaction mixture may be applied directly onto tobacco or may be fractionated to separate the volatile and nonvolatile fractions, which are then used as tobacco flavorants.

U.S. Pat. No. 3,722,516 discloses the addition of dihydroxyacetone alone or in combination with amino acids to enhance the natural flavor characteristics of tobacco, and especially the caramel-like or burned sugarlike aroma thereof.

Japanese Pat. No. 9239/71 discloses certain tobacco "perfumes" such as 1-deoxy-1-L-prolino-D-fructose, which is a sugar-amino acid condensation product. This compound, as well as others, are prepared by reacting an amino acid with a sugar in an aqueous or alcohol solvent, and usually in the presence of an acid catalyst such as malonic acid. The desired compounds may be separated and purified by the use of ion-exchange resins and are thereafter applied to tobacco.

Japanese Pat. No. 3398/73 discloses certain other specific amino acid-sugars such as 1-deoxy-1-L-alanino-D-fructose that are synthesized from their respective components by the Amadori rearrangement, in the presence of malic acid as catalyst, by heating at 130° C. for 15 minutes. The specific compounds are isolated and may be combined with cocoa to produce tobacco flavorants.

Two articles by Koehler (*Journal of Agricultural Food Chemistry*, Volume 17, Number 2, pages 393–396, 1969 and ibid., Volume 18, Number 5, pages 895–989, 1970) discuss pyrazine formation in sugar-amino acid model systems. The normal model system consists of asparagine and glucose reactants in a 1:1 molar ratio. Diethylene glycol solvent and a small amount of water are also used as solvents. The mixture is heated for 24 hours at 120° C. The use of a base catalyst, such as sodium hydroxide or ammonium hydroxide, results in an increase in the production of volatile alkylated pyrazines. In some instances the addition of an aldehyde, such as acetaldehyde, appeared to increase pyrazine formation. Koehler's work was related to browning reactions known to occur in foods such as roasted peanuts, coffee, cocoa, and potato chips; and his primary object was to determine the chemical factors involved in volatile pyrazine formation during such reactions. Although volatile pyrazines were isolated and identified, there is no suggestion by Koehler that his reaction mixture would be suitable for use as a tobacco flavorant.

There is described in co-pending, commonly assigned U.S. application Ser. No. 029,244 filed Apr. 12, 1979 certain reaction flavors for smoking products wherein amino acids containing at least two nitrogens are reacted with reducing sugars and ammonium hydroxide in an essentially solvent-free system, and optionally in the presence of certain aldehydes. The ratio of reducing sugar to amino acid, based on weight, is in the range of about 2–8:1 and the ratio of sugar to ammonium hydroxide is approximately 3–10:1 based on the weight of the reactants. The reactants are heated for a period of time sufficient to reach a temperature in the range of about 90° to 115° C. and then cooled. The resultant flavorant, either diluted or undiluted, is applied to smoking compositions, and particularly reconstituted tobacco, at a level between about 0.001 to about 5% based on the weight of the composition.

SUMMARY OF THE INVENTION

The present invention provides a method for preparing reaction flavors for smoking compositions wherein a reducing sugar is combined with a source of ammonia in the presence of a trace amount of an amino acid to form a reaction mixture which is heated to a temperature in the range of about 90° to 105° C. Once the desired temperature range is attained, the heating may be continued for about 5 to 15 minutes or, alternately, the reaction mixture is removed from the heat source and cooled to room temperature. The thus prepared mixture has been found to produce desirable reaction products highly suitable for use in smoking products, and particularly those having a high content of tobacco stems. Application of the reaction flavorant to the stems at a level up to about 5% by weight of the stems produces an acceptable smoking product.

Although the reaction flavor product has been found particularly suitable for use in enhancing the flavor and aroma of tobacco stems, such reaction flavors are equally suitable for use on other smoking materials selected from tobacco leaf, reconstituted tobacco, non-tobacco smoking substitutes and mixtures thereof. The reaction flavors may be incorporated therein at a level from about 0.5 to 10% by weight based on the dry weight of the smoking material.

The use of such reaction flavors, particularly in tobacco compositions having a high stem content, results in a tobacco product having improved smoking characteristics. The flavorant-stem product is highly suitable for use in cigarettes at a blend level up to 50% if desired.

DESCRIPTION OF THE PREFERRED EMBODIMENTS

Reducing sugars are reacted with a source of ammonia in the presence of a trace amount of certain amino acids to produce flavorants suitable for use in smoking products. Suitable reducing sugars include glucose, fructose, mannose, galactose, and mixtures thereof, with syrups containing approximately 42% or more of fructose being preferred. Disaccharides and polysaccharides may also be used as the source of reducing sugar as long as they are converted to monosaccharides by conventional hydrolysis prior to reacting with the other named reagents. Saccharide mixtures such as corn syrup, malt syrup and invert sugar may also be used as long as conversion to monosaccharides preceeds the reaction with amino acids.

Representative amino acids include aspartic acid and glutomic acid and the monoamides thereof, specifically asparagine and glutamine. The weight ratio of sugar to amino acid will generally be in the range of 200–300:1 with a ratio of about 235–245:1 being preferred. The preferred source of ammonia for purposes of this invention is concentrated ammonium hydroxide. The weight ratio of sugar to concentrated ammonium hydroxide (30%) will generally be about 5–15:1 with 6–8:1 being preferred. It will be appreciated that alternate sources of ammonia may be employed, such as gaseous or liquid ammonia or subjectively acceptable ammonium salts. Suitable ammonium salts include ammonium orthophosphate, ammonium dihydrogen orthophosphate, diammonium monohydrogen orthophosphate, ammonium citrate, ammonium acetate and the like.

The reaction is generally carried out in a flask, preferably one equipped with a reflux condenser to prevent loss of desirable volatiles. The flask and contents may be heated in a steam bath, an oil bath, or the like, and the time necessary to reach the optimum temperature of about 90° to about 105° C. is determined either by the size of the reaction vessel or the temperature of the heating system or both. A stainless steel jacketed vessel having a steam inlet and outlet, condenser and cooling coils may be used for larger scale reactions. In most instances it is only necessary to bring the reactants to the desired temperature, and then the reaction is stopped by removing the heat source. In certain instances it may be desirable to continue heating for about 5 to 15 minutes once the desired temperature is attained. Best results are obtained when the reaction mixture is actively cooled to about 49° C. or lower. Cooling may readily be effected by diluting the reaction mixture with water, or, alternatively, the reaction mixture may be cooled by means such as cooling coils within the reaction vessel, an ice bath and the like.

Although the cooled reaction flavor product may be used without further dilution, it may, in certain instances, be desirable to dilute the flavor product with an acceptable diluent. The degree to which the reaction flavor product is diluted with water or other acceptable diluent is a matter of choice and may, to some extent, depend upon its ultimate use. Generally a 1:1 to about a 5:1 dilution with water is adequate and results in an aqueous reaction flavorant product readily adaptable for use on any type of smoking composition.

The term "smoking composition" includes all forms of tobacco, such as shredded filler, leaf, stem, stalk, homogenized leaf cured, reconstituted cigar binder, pipe tobaccos, or reconstituted tobacco in sheet or predetermined forms, which are cast or extruded from "tobacco slurries." Rolled and cut tobacco stems in either expanded or unexpanded form are particularly preferred. In addition, smoking compositions may encompass the various smoking substitutes formulated from non-tobacco materials. The smoking substitute may be utilized alone or blended in varying proportions with other forms of tobacco. Representative formulations for non-tobacco smoking materials may be found in U.S. Pat. Nos. 3,529,602; 3,703,177; 3,796,222; 4,019,521; 4,079,742; and references cited therein.

The reaction flavors produced in accordance with the present invention may be applied to the smoking composition by direct spraying methods known in the art. They may also be applied by dispersing or diluting further in a suitable carrier, water for example, or may be directly mixed or otherwise combined with the smoking material. Whan an aqueous carrier is employed, the mixture is air-dried or otherwise treated to remove the carrier. Generally the reaction flavor product will be incorporated into the smoking composition or a component thereof at a level of 0.5 to 10% by weight of the composition. It will be recognized that larger amounts of the reaction flavor product may be incorporated into a single tobacco component which is then blended with other filler materials to produce a smoking composition having the previously described level of reaction flavor product.

The reaction flavors can, if desired, be incorporated in cigarette paper or in filters. However, it will generally be more desirable to incorporate the flavors in the smoking composition itself.

In a preferred embodiment, the cooled reaction flavor is diluted approximately 1:1 with water and sprayed or otherwise applied to rolled, crushed tobacco stems which are subsequently shredded and blended with conventional tobacco filler at a level up to about 50% based on the total weight of the filler. Humectants and additional casing materials conventionally employed in tobacco processing may be incorporated with the reaction flavorant or applied separately to the stem material. Stems having the reaction flavor applied thereto, on smoking, have a smoother response and less "stemmy" taste. In addition, stems containing the reaction flavor may be incorporated at a higher level in a blend than previously possible.

The following examples are illustrative.

EXAMPLE I

To a glass jacketed reaction vessel equipped with reflux condenser and stirrer/agitator were added the following reactants: 1278 grams of a syrup containing 72% fructose by weight (900 Isomerose TM Syrup, Clinton Corn Sweetners), 3.9 grams DL-aspartic acid and 150 ml of concentrated (30%) ammonium hydroxide. The contents of the reaction vessel were stirred and heated by passing steam through the jacket until the temperature of the reaction solution reached 95° C. The steam was terminated and the contents of the vessel were removed and allowed to cool to room temperature. The yield of reaction flavor product was 1397.5 grams or 98.6%.

The cooled reaction mixture was sprayed on shredded, flue-cured tobacco stems to a level of 2.5% by weight. In addition, glycerine and propylene glycol were sprayed to a level of 2% each by weight of the stems. The stems were fabricated into cigarettes having conventional cellulose acetate filters attached thereto. Control cigarettes were made in a similar manner using untreated stems. A small panel of experienced smokers smoked and compared the treated stem cigarettes with the control and found the treated cigarettes to be less hot and harsh. Although a bitter aftertaste was noted, the treated cigarettes seemed smoother and less peppery than the control.

EXAMPLE II

In a manner similar to Example I, 314 grams Isosweet (Staley 71% solids solution containing 42% fructose, 50% glucose, 1.5% maltose and 1.5% isomaltose) was combined in the glass jacketed reaction vessel with 1 gram DL-aspartic acid and 37.6 grams concentrated ammonium hydroxide. Steam was passed through the jacket until the internal temperature reached 94° C. The time required to reach the desired temperature was 15 minutes. The final pH of the reaction mixture was 5.3.

The reaction mixture was cooled to room temperature and an aliquot of undiluted reaction flavor product was sprayed on two batches of flue-cured tobacco stems to a level of 4% by weight and 2.6% by weight respectively. Cigarettes were made using 100% of the treated stem material. Controls were made using identical flue-cured stems having no reaction flavor added thereto. Cellulose acetate filters were attached to all cigarettes prior to smoking. The cigarettes were smoked by an experienced panel of smokers. The cigarettes having 4% reaction flavor added thereto were found to have a burnt character or off-taste, were slightly peppery, and had a hot aftertaste. The smokers also noted a slight papery character. The cigarettes treated at the 2.6% weight level had less stemmy character and hotness and were less papery than the cigarettes treated at the 4% level.

EXAMPLE III

The following ingredients were premixed and added to a reaction vessel containing 50 ml concentrated ammonium hydroxide as in Example I:
426 grams Isomerose 900;
1.3 grams glutamine.

The contents of the vessel were stirred and heated to 95° C. and then cooled. An aliquot of the cooled solution was diluted 1:1 with water and 10 μl portions were injected into a conventionally blended cigarette containing 20% by weight of the blend of unflavored, uncased reconstituted tobacco. The treated cigarettes were smoked and compared to untreated controls containing the same blend. The treated cigarettes were found to be generally smoother, less hot and peppery, less burnt and slightly sweet. An off-note was noted.

Flue-cured stems were sprayed to a weight level of 2.5% with an undiluted aliquot of the reaction flavor. Propylene glycol and glycerine were each sprayed on the same stems to a 2% weight level. On smoking, cigarettes containing the treated stems were found to have a smoother, slightly burnt and bitter taste as compared to the controls.

EXAMPLE IV

In a manner identical to Example III, 1.3 grams glutamic acid was substituted for glutamine and the mixture was heated to 95° C. and cooled. An aliquot of the reaction product was diluted 1:1 and 10 μl portions were injected into cigarettes identical to those of Example III. On smoking, the treated cigarettes were found to be smoother, less bitter, more peppery and salty. Flue-cured stems were treated as in Example III. On smoking, the treated stems were smoother, slightly sweet, had less burnt taste and were not as harsh. A slightly bitter to sweet aftertaste was noted by some of the smokers.

EXAMPLE V

Two reaction flavors (A and B) were prepared in which the reactants were combined, heated to 93° C. in a reaction vessel and then cooled to room temperature. The reactants were as follows:
A. 361 grams 900 Isomerose TM; 1.3 L-glutamic acid; 50 ml concentrated NH₄OH;
B. 542 grams 900 Isomerose TM; 1.3 L-glutamic acid; 50 ml concentrated NH₄OH;

Undiluted reaction flavors A and B were sprayed on flue-cured bright stems to a level of 2.5% by weight of the stems. Glycerine and polyethylene glycol were sprayed on the flavored stems at a 2% weight level. On smoking 100% stem cigarettes, a smoother, slightly green papery or burnt taste was noted for reaction flavor A. Cigarettes containing reaction flavor B were slightly harsh, papery and had a green, burnt taste.

What is claimed is:
1. A process for preparing a reaction flavor product which comprises the following steps:
(a) preparing a mixture of a reducing sugar and ammonium hydroxide wherein the weight ratio of reducing sugar to ammonium hydroxide is in the range of 5–15:1;
(b) adding a trace amount of a compound selected from the group consisting of an amino acid and a monoamide thereof to said mixture of step (a), wherein the ratio of reducing sugar to said compound is in the range of 200–300:1;

(c) heating said mixture to a temperature in the range of 90° to 105° C.; and thereafter (d) cooling said mixture to room temperature.

2. The process of claim 1 wherein the said compound thereof is selected from the group consisting of aspartic acid, glutamic acid, asparagine and glutamine and their monoamides.

3. The process of claim 1 wherein the weight ratio of sugar to concentrated ammonium hydroxide (30%) is 6–8:1.

4. The process of claim 1 wherein the reducing sugar is selected from the group consisting of fructose, glucose, mannose, galactose and mixtures thereof.

5. The process of claim 1 wherein the weight ratio of sugar to said compound is 235–245:1.

6. The process of claim 1 wherein the reaction flavor product is cooled by diluting with water, said water being added in an amount sufficient to effect a 1–5:1 dilution of the reaction flavor product.

7. The process of claim 1 wherein heating is continued for 5 to 15 minutes after the temperature reaches 90° to 105° C.

8. A reaction flavor product prepared by the process of claim 1.

9. A smoking composition comprising a filler material selected from tobacco, reconstituted tobacco, non-tobacco smoking substitute and mixtures thereof, and the reaction flavor product of claim 8.

10. The smoking composition of claim 9 comprising a filler of blended tobaccos having incorporated therein between about 0.5 to 10% by weight of the filler of the reaction flavor product.

11. The smoking composition of claim 9 comprising a filler of tobacco, reconstituted tobacco and tobacco stems wherein tobacco stems comprise up to 50% by weight of the filler and said stems have incorporated therein up to 5% by weight of the stems of the reaction flavor product.

12. The smoking composition of claim 9 comprising a filler of a non-tobacco smoking substitute having incorporated therein between about 0.5 and 10% by weight of the smoking substitute of the reaction flavor product.

* * * * *